J. LOKODY.
MILK CAN LOCK.
APPLICATION FILED APR. 29, 1910.

965,590.

Patented July 26, 1910.

WITNESSES
Edwin Frey
K. H. Butler

INVENTOR
J. Lokody
BY
N. C. Everhes
ATTORNEYS

THE NORRIS PETERS CO., WASHINGTON, D. C.

UNITED STATES PATENT OFFICE.

JOHN LOKODY, OF HOOVERSVILLE, PENNSYLVANIA.

MILK-CAN LOCK.

965,590. Specification of Letters Patent. Patented July 26, 1910.

Application filed April 29, 1910. Serial No. 558,446.

*To all whom it may concern:*

Be it known that I, JOHN LOKODY, a subject of the King of Hungary, residing at Hooversville, in the county of Somerset and State of Pennsylvania, have invented certain new and useful Improvements in Milk-Can Locks, of which the following is a specification, reference being had therein to the accompanying drawing.

This invention relates to certain new and useful improvements in milk can locks, and has for its primary object to provide a novel and effective lock so constructed as to be exceedingly difficult by those unfamiliar with the manner of unlocking, yet which can be easily manipulated to remove the lid of the milk can by those familiar with the construction and operation of the lock.

Briefly described, the invention comprises in connection with a milk can top, means for securely and effectively locking the milk can top in the neck of the milk can, and novel means for releasing the lock so as to permit the removal of the milk can top or lid when desired.

Figure 1:
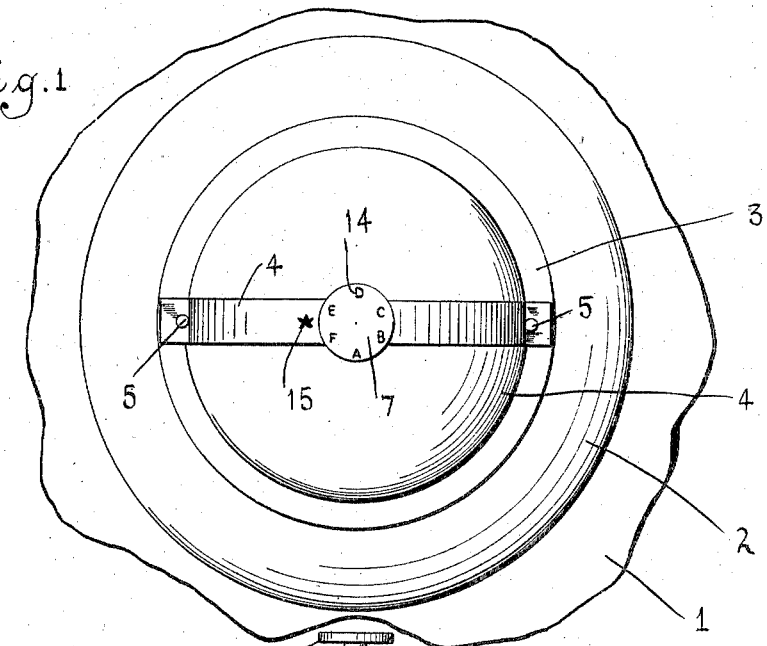
Figure 2:
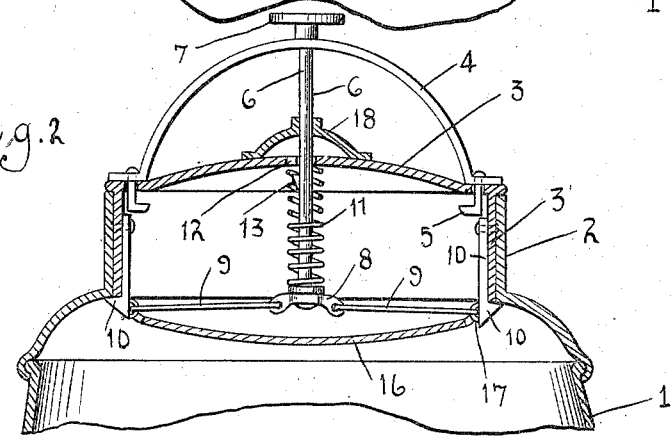
Figure 3:
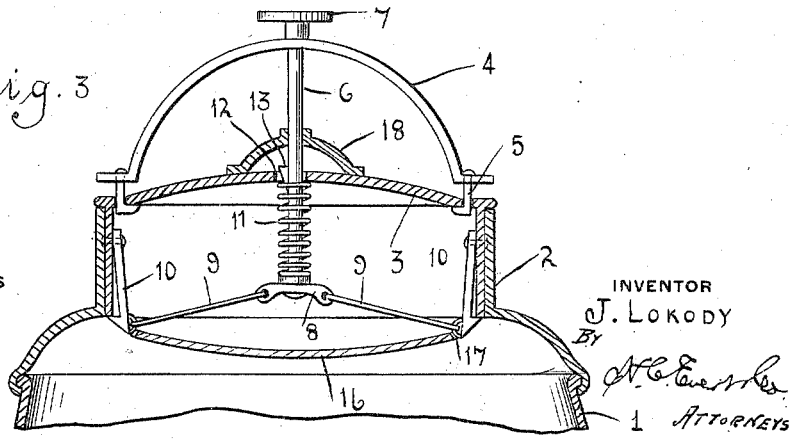

The invention consists of the novel construction, combination and arrangement of parts as will be hereinafter more fully described and then particularly claimed, and in describing the invention in detail, reference will be had to the accompanying drawing forming a part of this specification, and wherein like numerals of reference will indicate like parts throughout the different views, in which:

Figure 1 is a top plan view of a milk can with my improved lock applied thereto, the body of the can being broken away, Fig. 2 is a vertical sectional view of a part of a milk can with the lid therein in locked position, and Fig. 3 is a similar view showing the lock in unlocked position so that the lid may be removed.

In the drawings, 1 denotes a milk can of the usual form, provided with the usual cylindrical shaped neck of materially less diameter than the can.

3 denotes the lid of the can top, which as usual is provided with a depending annular flange 3', which fits within the neck 2 of the milk can.

Extending across the top of the lid 3 is a bow-shaped yoke 4, movably connected with the lid 3 adjacent the opposite sides of the latter by hooks 5, the shanks of which extend through openings provided therein in the lid 3.

Extending centrally through an opening in the lid 3 is a rod 6, which also extends through the yoke 4 at the crown of the latter, and, upon its upper end, is provided with a head or disk 7. This rod 6 extends downwardly below the lid 3 for some distance, and at its lower end carries a coupling member 8, to the ends of which are loosely connected one end of links 9, the other ends of which links are loosely connected to resilient catches 10. These catches are carried by the depending annular flange 3' of the milk can lid or top, the hooks of the catches, which are at the lower ends thereof, being adapted to engage under the neck 2 of the milk can, in a manner as clearly shown in Fig. 2 of the drawing.

The rod 6 is normally retained in its lower position by means of a coil spring 11 arranged on the rod between the coupling member 8 and the lid 3. The said lid 3 is provided with a slot or notch 12, which registers with the central opening in the lid through which the rod 6 extends, and on the rod 6 is a somewhat triangular shaped lug 13 which will pass through the slot 12 when the rod has been properly positioned therefor.

The head or disk 7 is provided on its upper face with a plurality of indicating marks, such as shown at 14, and on the yoke 4 adjacent the crown thereof is also placed a suitable indicating mark as 15. In order to protect the mechanism of the lock from the contents of the can, I provide the can top with a concaved bottom 16, provided adjacent opposite sides with small openings 17 so as to permit of the connecting of the outer ends of the links 9 with the resilient catches 10. If desired, also, the can lid 3 may be provided with a bow strap or bearing 18 for the rod 6, though obviously this strap may be omitted.

Obviously, the disk 7 together with its indicating marks, the indicating mark on the yoke, and the lug 13 and slot 12 constitute what may be termed a permutation lock. To remove the can lid or top, the rod 6 must be turned so as to bring the proper mark 14 on the disk 7 opposite the mark 15 on the yoke, which will aline the lug 13 with the slot 12 and permit of the rod 6 being pulled upwardly and of the lug 13 passing upward through the slot 12. The upward pull on the rod 6 withdraws the catches 10 from engagement beneath the milk can top, and a further upward lift on the yoke 4 and rod 6 withdraws the milk can top from the milk can neck. The yoke 4 lifts on the can top at opposite sides thereof, and relieves the strain from the lock mechanism in the withdrawing of the milk can top.

When the milk can top is inserted in the neck, the rod 6 is forced downwardly so as to force the catches 10 underneath the milk can neck and the rod 6 turned so as to move the lug 13 out of registry with the slot 12. The bearing 18 also constitutes a shield over the opening 12, and makes it impossible for anyone to determine the correct combination by turning the rod 6 until they observe when the lug 13 is opposite the slot 12. The concaved bottom 16 of the milk can top effectually protects the lock mechanism from injury by the contents of the can.

What I claim is:—

1. In combination with a milk can having a neck and a lid having a flange adapted to fit within said neck, of lock mechanism comprising a rod movable vertically in the lid, a yoke loosely connected with the lid and through which the rod extends and constituting means for removing and replacing the lid when the lock mechanism is released, a coupling member carried by the lower end of the rod, resilient catches carried by the flange of said lid, and links connecting said catches with said coupling member.

2. In combination with a milk can having a neck, and a lid therefor having a flange fitting within the neck, of a lock mechanism comprising a rod movable vertically through the lid, a yoke connected with the lid and through which the rod extends and constituting means for removing and replacing the lid when the lock mechanism is released, a coupling member loosely connected to the lower end of the rod, resilient catches carried by the flange of said lid, links connecting said coupling member with said catches, and a coil spring on the rod between the lid and said coupling member.

3. In combination with a milk can having a neck, and a lid having a flange fitting within said neck, of lock mechanism comprising a rod movable vertically through the lid, resilient catches carried by the flange of said lid to engage underneath the milk can neck, means connecting said catches with the rod, a coil spring on said rod confined between the lid and the lower end of the rod, a lug on the rod adapted to pass through a slot provided therefor in the lid when the rod is properly positioned and means at the upper end of the rod for determining the position of the lug with respect to the slot.

In testimony whereof I affix my signature in the presence of two witnesses.

JOHN LOKODY.

Witnesses:
W. R. Jones,
Earl Lohr.